(12) United States Patent
Haskew

(10) Patent No.: US 6,786,714 B2
(45) Date of Patent: Sep. 7, 2004

(54) DELIVERY SYSTEM FOR LIQUID CATALYSTS

(76) Inventor: James W. Haskew, 10058 Deer Wood Dr., Joplin, MO (US) 64804

( * ) Notice: Subject to any disclaimer, the term of this patent is extended or adjusted under 35 U.S.C. 154(b) by 111 days.

(21) Appl. No.: 10/087,724

(22) Filed: Mar. 1, 2002

(65) Prior Publication Data

US 2002/0150514 A1 Oct. 17, 2002

Related U.S. Application Data

(60) Provisional application No. 60/283,195, filed on Apr. 12, 2001, provisional application No. 60/295,412, filed on Jun. 4, 2001, and provisional application No. 60/355,161, filed on Feb. 8, 2002.

(51) Int. Cl.[7] .................... F23J 7/00; F23L 9/00
(52) U.S. Cl. ............... 431/4; 431/190; 431/12; 422/145; 123/25 A
(58) Field of Search ................... 431/407, 190, 431/354, 202, 12; 422/145, 231, 140; 123/25 A, 208

(56) References Cited

U.S. PATENT DOCUMENTS

| | | |
|---|---|---|
| 2,086,775 A | 7/1937 | Lyons et al. |
| 3,800,768 A | 4/1974 | Rhodes et al. |
| 3,862,819 A | 1/1975 | Wentworth, Jr. |
| 3,929,118 A | 12/1975 | Leong |
| 3,940,923 A | 3/1976 | Pfefferle |
| 4,014,637 A * | 3/1977 | Schena ................. 431/4 |
| 4,090,838 A | 5/1978 | Schena et al. |
| 4,170,200 A | 10/1979 | Takeuchi et al. |
| 4,295,816 A | 10/1981 | Robinson |
| 4,334,998 A | 6/1982 | Rios et al. |
| 4,410,467 A | 10/1983 | Wentworth, Jr. |
| 4,438,073 A | 3/1984 | Kubo et al. |
| 4,475,483 A | 10/1984 | Robinson |
| 4,493,637 A | 1/1985 | Ganter et al. |
| 4,538,981 A | 9/1985 | Venturini |
| 4,548,232 A | 10/1985 | Rusteberg |
| 4,725,226 A | 2/1988 | Balsiger et al. |
| 4,802,335 A | 2/1989 | Bidwell |
| 5,085,841 A | 2/1992 | Robinson |
| 5,331,924 A | 7/1994 | Kraus |
| 5,340,383 A | 8/1994 | Womack |
| 5,386,690 A | 2/1995 | Shustorovich et al. |
| 5,558,513 A | 9/1996 | Wentworth, Jr. |
| 5,592,903 A * | 1/1997 | Wentworth, Jr. .......... 123/25 A |
| 5,604,980 A | 2/1997 | Shustrovich et al. |
| 5,758,606 A * | 6/1998 | Rosen et al. .............. 123/25 B |
| 5,924,280 A | 7/1999 | Tarabulski |
| 5,968,464 A | 10/1999 | Peter-Hoblyn et al. |
| 5,976,475 A | 11/1999 | Peter-Hoblyn et al. |
| 6,176,701 B1 | 1/2001 | Robinson |
| 6,230,698 B1 * | 5/2001 | Shaw ........................ 123/572 |
| 6,419,477 B1 | 7/2002 | Robinson |

OTHER PUBLICATIONS

*Proceedings of the 7th US Mine Ventilation Symposium*, Society for Mining, Jun. 5–7, 1995; pp. 95–98.
*Simultaneous Reduction of Soot and Nox in Diesel Engines by Homogeneous Catalysis of Group Platinum Metals*, SAE Technical Paper Series, Aug. 7–10, 1989; pp. 1–11.

* cited by examiner

Primary Examiner—Alfred Basichas
(74) Attorney, Agent, or Firm—Schmeiser, Olsen & Watts, LLP

(57) ABSTRACT

A delivery system for generating a sparging gas containing catalyst particles and delivering them to a flame zone of a combustion reaction is disclosed. A catalyst mixture receptacle for the delivery system includes a floating ball check valve on an air inlet to an inlet tube of the receptacle which is spaced from a vertical wall of the receptacle. A secondary splash chamber having an opening smaller than the body of the chamber is also included between the main body of the receptacle and the sparging gas outlet for the receptacle to reduce the opportunity for catalyst mixture in liquid form to reach the sparging gas outlet. An enrichment circuit is disclosed including a controller, pump, and a one-way check valve for adding additional sparging gas to a flame zone of a combustion process in times of added load. The receptacle may be mounted with a vibrator, such as the pump, to increase the consistency of the bubbles in the sparging process. Alarms and indicators, including remote alarms and indicators, may also be included to relay pertinent information regarding the delivery system. The sparging gas may thereafter be pressurized and injected in particular applications.

22 Claims, 4 Drawing Sheets

US 6,786,714 B2

DELIVERY SYSTEM FOR LIQUID CATALYSTS

This application is related to U.S. Provisional Patent Application Serial No. 60/283,195, filed on Apr. 12, 2001, entitled "LIQUID CATALYST TRANSPORT SYSTEM FOR DIESEL ENGINES", U.S. Provisional Patent Application Serial No. 60/295,412, filed on Jun. 4, 2001, entitled "LIQUID CATALYST FOR THE REDUCTION OF EMISSIONS IN GAS AND DIESEL ENGINES", and U.S. Provisional Patent Application Serial No. 60/355,161, filed on Feb. 8, 2002, entitled "DELIVERY SYSTEM FOR LIQUID CATALYSTS". The disclosure of these related applications are incorporated herein by this reference.

BACKGROUND OF THE INVENTION

1. Technical Field

Figure 9:
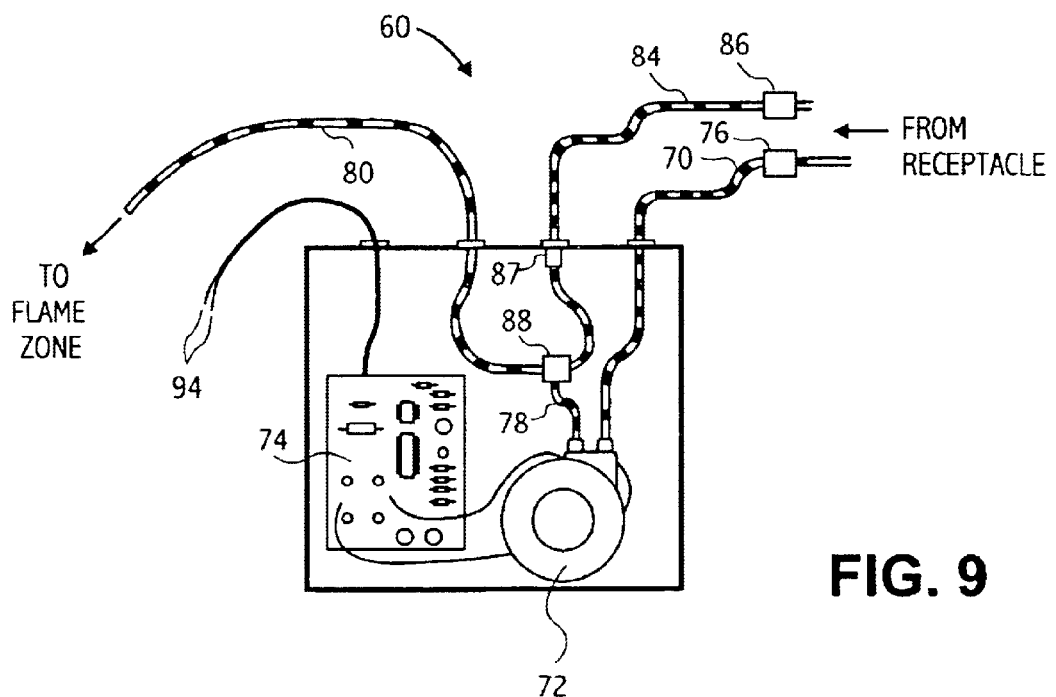

This invention generally relates to a system for delivering a catalyst into a flame zone of a combustion reaction, such as a fuel combustion chamber. More specifically, embodiments of the invention include a catalyst reservoir which produces an catalyst-containing aerosol, vapor or sparging gas and a catalyst transport system to transport the catalyst to the flame zone. Specific embodiments of the invention may include a vacuum source to draw the catalyst-containing gas to the flame zone and an enrichment circuit to cause an increase in the amount of catalyst being drawn to the flame zone when increased catalyst enrichment is required.

2. Background Art

Sparging gas, catalyst vapors and aerosols have been used in the combustion reaction art to increase the energy output of fuel combustion systems. In conventional sparging gas delivery systems, a vacuum is created above a pool of liquid in a receptacle to cause atmospheric air to be drawn into the receptacle at a location below the surface of the liquid. Generally, the liquid in a conventional system includes a carrier liquid with an oil or other catalyst floating on top of the carrier or, more recently, a catalyst solution including a base carrier and a soluble catalyst. The vacuum created above the liquid causes bubbles to rise through the liquid and into the air above the liquid with a portion of the liquid adhering to the surface of the bubbles. At some point above the surface of the liquid, the bubbles burst and a portion of the catalyst which was on the surface of the bubbles remains in the air above the liquid. This process is commonly called sparging and the resulting catalyst-containing gas is called "sparging gas." Tiny particles of catalyst are thereby drawn away in sparging gas form by the vacuum and supplied into the induction air of a combustion system to affect the combustion reaction.

In conventional sparging processes, however, the catalyst receptacles are configured such that the bubbles contact solid barriers as they rise to the top of the liquid. This contact reduces the amount of liquid that can adhere to the surface of the bubble. Conventional systems also have a sparging gas outlet immediately above the bursting bubbles. With this arrangement, the catalyst solution from the bursting bubbles may directly splash into the sparging gas outlet and travel to the flame zone in liquid form rather than as a sparging gas, quickly consuming the catalyst solution at an uncontrolled rate. This unnecessary and uncontrolled consumption causes the system to become ineffective and inefficient. Another undesirable aspect of conventional delivery systems is that if, instead of the negative pressure of a vacuum, positive pressure occurs in the receptacle above the liquid, the liquid may be forced through the air inlet and overflow from the system. This phenomenon is commonly called percolation. One specific limitation of conventional sparging gas catalyst delivery systems is that the catalyst delivery rate of the system is either fixed or proportional to the vacuum rate of the combustion system and cannot be automatically enriched with increased demand.

DISCLOSURE OF THE INVENTION

The present invention relates to a liquid catalyst delivery system which includes a liquid catalyst receptacle and a catalyst transport system for delivering a sparging gas containing catalyst to a flame zone of a combustion reaction. Embodiments of the invention include an air inlet which releases air into a catalyst receptacle such that bubbles released from the air inlet port do not contact a solid surface as they pass through the catalyst solution, a non-restrictive check valve on the air inlet, and a chamber adjacent to the main body of the catalyst receptacle, the chamber having an opening with a diameter smaller than the diameter of the body of the chamber to assist in passing only the sparging gas to the flame zone. Reinforcing structural elements which assist in mounting the receptacle to a body are also included.

Embodiments of the catalyst transport system may be as simple as a simple tube, or more complex, including a pump, controllers, alarms, sensors and an enrichment circuit. Pumps may be continuous or controlled by controllers in response to the needs of the combustion process. The enrichment circuit may also be continuous, have predetermined thresholds for providing added catalyst to the system, or may be controlled by controllers in response to the needs of the combustion process. Alarms and timing circuits may be used to convey information regarding the process, the system, or sensors associated with the system. A remote indicator of the need to replenish contents of the catalyst receptacle, or components of those compounds may also be provided to the system. A vibration source may be added by mounting the receptacle to a mounting plate in association with the vibration source, such as the pump. Vibration of the environment may similarly be dampened by mounting the receptacle in a configuration buffered from the environment, such as on cushioned mounts.

The foregoing and other features and advantages of the present invention will be apparent from the following more detailed description of the particular embodiments of the invention, as illustrated in the accompanying drawings.

BRIEF DESCRIPTION OF THE DRAWINGS

FIG. 1 is a cut-away view of a liquid catalyst receptacle configured according to an embodiment of the present invention viewed along line 1—1 of FIG. 4;

FIG. 2 is a bottom view of an air inlet cap configured according to an embodiment of the present invention;

FIG. 3 is a bottom view of a chamber cap with two nipples according to an embodiment of the present invention;

FIG. 4 is a top view of the receptacle of FIG. 1;

FIG. 5 is a front view of an embodiment of the receptacle of FIG. 1, but having a chamber cap with one nipple;

FIG. 6 is a block diagram of a catalyst delivery system configured according to an embodiment of the present invention;

FIG. 7 is a system diagram of a catalyst delivery system having an enrichment circuit configured for a reciprocating engine according to an embodiment of the present invention;

FIG. 8 is an embodiment of a catalyst transport system for a catalyst delivery system having an enrichment circuit illustrating catalyst flow under low catalyst requirement conditions; and FIG. 9 is an embodiment of a catalyst transport system for a catalyst delivery system having an enrichment circuit illustrating catalyst flow under high catalyst requirement conditions.

DETAILED DESCRIPTION OF EMBODIMENTS OF THE INVENTION

As discussed above, embodiments of the present invention relate to a liquid catalyst delivery system for a combustion reaction whereby catalyst is transported in sparging gas form to the flame zone of the combustion reaction. As used herein, "flame zone" refers to the region where the combustion reaction occurs. In cases where the combustion reaction is enclosed within a combustion chamber, such as within the piston chamber of a reciprocating piston engine, the flame zone is the space within the combustion chamber. In other cases where the combustion reaction is not within a combustion chamber but is, instead, open to the environment, such as with many open flame applications, the flame zone is the region in which combustion of any fuel may occur.

Figure 1:
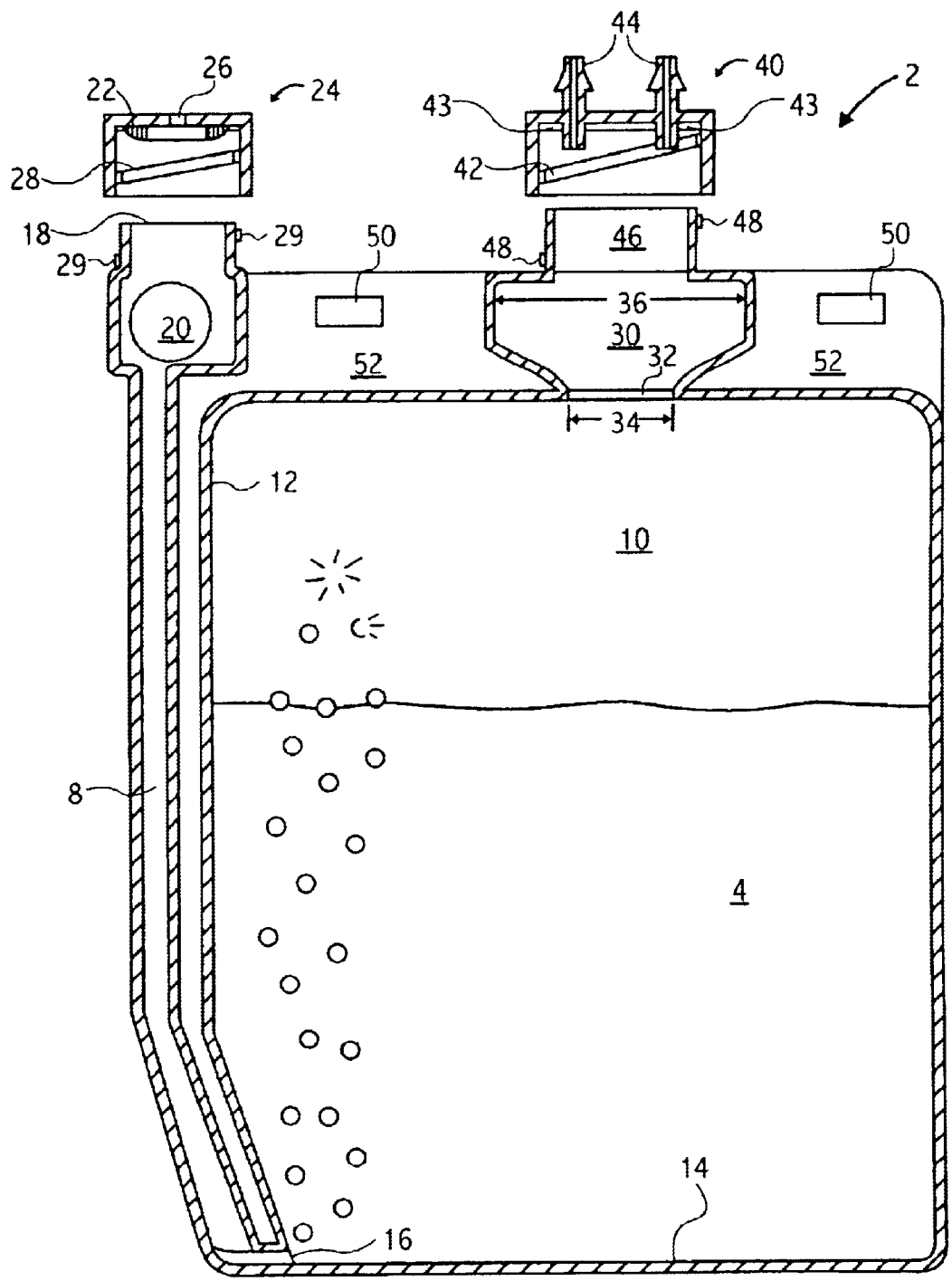
Figure 2:
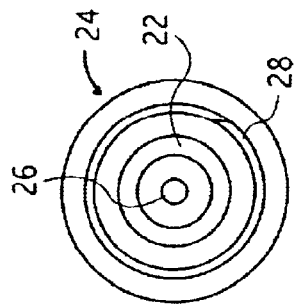

FIG. 1 illustrates an embodiment of a liquid catalyst receptacle 2 for use in a catalyst delivery system of the present invention. In the catalyst delivery system shown in FIG. 1, the receptacle 2 contains a catalyst mixture 4. Examples of general carrier liquids, catalysts and catalyst mixtures, and an explanation of the general operation of transferring the catalysts to an aerosol form through the use of bubbling is generally disclosed in U.S. Pat. No. 4,295,816 ((Oct. 20, 1981) to Robinson), U.S. Pat. No. 4,475,483 ((Oct. 9, 1984) to Robinson), and U.S. Pat. No. 5,085,841 ((Feb. 4, 1992) to Robinson), the relevant disclosures of which are hereby incorporated herein by reference. In general operation, air is drawn into the receptacle 2 through an air inlet 8 by a vacuum formed in the air region 10 above the catalyst mixture 4. The air drawn into the receptacle 2 rises through the mixture 4 in the form of bubbles which burst within the air region 10 above the liquid. The bursting of the bubbles releases particles of catalyst into the air region 10, and a portion of that catalyst is drawn as a sparging gas containing catalyst particles out of the top of the receptacle by the vacuum. Further discussion of this operation is discussed below in reference to FIGS. 6–9.

The air inlet 8 of the embodiment shown in FIG. 1 includes an inlet channel which extends along a side 12 of the receptacle 2 and enters near the bottom 14 of the receptacle 2. The inlet channel includes a vertical portion and a portion which angles from the vertical portion to the bottom of the receptacle 2. An air inlet opening 18 is located near the bottom of the receptacle 2, and is horizontally separated from the vertical portion of the inlet channel by the angled portion. Alternatively, the air inlet 8 could extend through the center of the receptacle 2, or separate from the receptacle 2. While the air entry port 16 into the receptacle may be formed at any location on the receptacle 2, because the bubbles ascending through the mixture 4 are significant to the benefits of the invention, it is beneficial to place the air entry port 16 near the bottom 14 of the receptacle. Wherever the air inlet 8 or air entry 16 are placed, the opening 18 of the air inlet 8 should be located above the level of the liquid within the air inlet 8. The liquid depth, through which the bubbles travel to reach the air region 10, may be any depth, but tends to work better at depths of about 2-½ inches or deeper, and more optimally between about 3-½ to about 4 inches. While shallower liquid depths may be sufficient in some embodiments of the present invention for particular applications of the invention, a liquid depth of about 2-½ inches or deeper provides time for particles in the mixture to adhere to the surface of the bubbles to transfer the catalyst to the air region 10. The deeper the liquid, the larger the bubbles which are released into the mixture. The volume of the receptacle 2 determines the quantity of catalyst mixture 4 which may be stored for use in the bubbling process, which in turn determines how many hours of operation the bubbling process may be used before the catalyst is depleted. The appropriate receptacle volume for a given application will vary depending upon the application and may readily be determined by one of ordinary skill in the art based upon the desired duration of operation, bubble rate and catalyst mixture viscosity.

The air entry port 16 of the embodiment of FIG. 1 is located and oriented such that the bubbles may ascend to the surface of the mixture 4 without contacting any solid surface after they are released into the mixture. In the present embodiment, this is accomplished by angling the air inlet 8 near the bottom 14 of the receptacle 2 so that the air entry port 16 is not directly adjacent a vertical wall 12 of the receptacle 2. In conventional receptacles for bubbling catalyst, the air entry is either directly adjacent a vertical wall of the receptacle, or at the bottom of a tube extended vertically into the liquid such that the tube itself, or a float attached to the tube, creates a vertical solid barrier to the bubbles. The result of a solid barrier near the ascending bubbles is that the bubbles have a tendency to bump into or adhere to the barrier. When the bubbles contact the barrier, their ascending velocity is slowed, and the consistency of the liquid adhering to the bubble surface is affected, resulting in a reduced bubble rate and less catalyst mixture transferred to the air region 10. When the bubbles adhere to the barrier, the bubble rate is reduced, and subsequent bubbles may be further impeded or combined with bubbles which have adhered to the barrier. This results in nonuniform bubble sizes, less effective catalyst transfer to the air region 10, and a less effective system.

To reduce the likelihood that bubbles will contact a vertical or other solid barrier within the receptacle 2, in the embodiment of FIG. 1 the air entry 16 is spaced from the wall. In the embodiment shown in FIG. 1, the air entry was placed one half inch from the vertical wall 12, and, for a bubble rate of from 2 to 15 bubbles per second traveling through about 2-½ to about 4 inches of liquid, the bubbles were permitted to ascend to the surface of the liquids without contacting the vertical wall 12. Other greater and lesser distances are contemplated, i.e. about ¼ inch or more, and it is anticipated that any degree of separation from the vertical wall 12, or other solid barrier, will result in an improvement over conventional systems. The farther away from the wall the entry port 16 is placed, the larger the bubbles which form at the entry port 16 due to the greater liquid weight on the air inlet 8. This occurs because a greater vacuum pressure is required to draw air through the entry port 16 due to the greater weight of the liquid which needs to be displaced by the vacuum. One of ordinary skill in the art of sparging gas catalyst delivery systems will readily be able to determine a desired distance from the wall at which a desired bubble size for a particular application will be formed without the bubble contacting a solid object before reaching the surface of the liquid.

Another problem experienced with conventional systems is the problem of percolation. Percolation may occur when the air region 10 of the receptacle includes a positive pressure rather than the ordinarily negative pressure caused by a vacuum. This causes the catalyst mixture 4 to be forced upward in air inlet tube 8. If the pressure is great enough, the catalyst mixture 4 is forced from the receptacle 2 into the surrounding environment. To protect against percolation, the embodiment of the invention shown in FIG. 1 includes a non-restrictive fluid check valve having a buoyant stopper 20 near the opening 18 to the air inlet 8, and a gasket 22 on an inlet cap 24. FIG. 2 includes a bottom view of the inlet cap 24. The inlet cap 24 also includes an opening 26 located within an opening in the gasket 22 for allowing air to be drawn into the receptacle. In conventional systems, fluid check valves are not used because they restrict the air inlet causing the bubble size of the process to change and require a greater vacuum pressure. For the fluid check valve designed for the present system, the opening 26 in the inlet cap 24 is large enough to permit more than the required volume of air flow needed to supply the bubbles at the desired rate. The area available for air flow around the buoyant stopper 20 and through the air inlet channel 8 are also large enough to not restrict the flow of air which would be expected in the system. The opening 26 in the inlet cap 24, however, is small enough that it may be blocked by the buoyant stopper 20 in conjunction with the gasket 22 if percolation occurs. Another advantage of using an inlet cap 24 with an opening 26 which was not experienced by conventional systems is that much of the dirt, ash and other foreign debris often associated with a combustion process, or with the environment surrounding conventional combustion processes, is prevented from entering the small hole and mixing with the mixture.

In standard operation, air flows into the air inlet 8 through the opening 26 in the inlet cap 24, around the buoyant stopper 20, and then through the air entry 16 into the receptacle 2. The inlet cap 24 includes internal threads 28 to threadedly mate with the external threads 29 on the air inlet opening 18. If positive pressure occurs within the receptacle 2 causing the liquid to rise as high as the buoyant stopper 20, the stopper 20 will float. If the liquid rises to a stop level high enough to float the stopper 20 to the inlet cap 24, the stopper 20 is pressed against the inlet gasket 22 to create a seal around the inlet cap opening 26, thus preventing the liquid from percolating into the surrounding environment. The buoyant stopper 20 may be formed of any buoyant material capable of creating a liquid-tight seal with a gasket, such as a plastic ball, and the gasket 22 may be formed of a resilient or other material capable of creating a liquid tight seal with the buoyant stopper 20, such as a foam, silicon or rubber material. Instead of a buoyant stopper 20 and gasket 22, any form of a check valve to prevent the escape of liquid is sufficient, but may require other design adjustments to compensate for any restriction in air flow. Other forms of fluid check valves are well known in the art.

Yet another problem experienced in conventional catalyst bubbling systems is the effect of splashing. When the bubbles burst in the air region 10 of the receptacle 2, the catalyst mixture on the surface of the bubbles disburses into the air above the liquid in the receptacle 2. Ideally, the bursting bubbles would distribute only small molecules evenly into the air as a thin sparging gas which could then be drawn into a fire zone of a combustion reaction. Unfortunately, however, the bursting bubbles often splash amounts of liquid into the air, or splash molecules which are too large to remain suspended in the sparging gas form as they are being drawn into the combustion reaction. Catalyst mixture delivered to the flame zone in liquid rather than sparging gas form may consume the catalyst mixture at too high a rate and is, therefore, undesirable. Conventional sparging gas catalyst distribution system receptacles include a vacuum outlet within the air region 10 above the liquid. This allows liquid to splash directly into the openings for the vacuum outlet, and allows larger liquid molecules to be drawn into and condense within the vacuum outlet or be consumed. Additionally, if the receptacle of a conventional system is used in an environment where high vibration or sloshing of the mixture within the receptacle is likely, such as for use with heavy construction equipment, the catalyst mixture in liquid form is likely to come into direct contact with the vacuum outlets and be drawn to and consumed in the combustion process.

To reduce the effects of liquid catalyst splashing into or condensing within the vacuum outlet, the embodiment of the present invention shown in FIG. 1 includes a chamber 30 adjacent to and in communication with the receptacle 2. The chamber 30 includes a chamber inlet 32 having a planar surface area, partially defined by its width 34, less than the planar surface area, parallel to the inlet planar surface area, of the widest body of the chamber, partially defined by its width 36. Use of this chamber 30 adjacent to the receptacle provides primarily two advantages. First, by placing the vacuum outlet within a chamber 30 separate from the main body of the air region 10 above the liquid, there is less of a likelihood that splashes from the bubbles will directly hit the vacuum outlet opening. Second, by using a chamber 30 through which the sparging gas must pass before traveling through the vacuum outlet, the velocity at which the sparging gas is traveling through the chamber inlet 32 with smaller area is faster than when the sparging gas travels through the main body of the chamber 30 having a larger area. One result of this velocity change is that large liquid molecules tend to drop out of the gas phase, condense on the walls of the chamber 30, and run back into the receptacle 2. Use of a chamber 30 separate from the main body of the receptacle also significantly reduces the likelihood that high vibration or sloshing of the catalyst mixture will result in catalyst being transferred to the flame zone in liquid form because the relatively small opening 32 to the chamber along the wall of the receptacle 2 results in the receptacle wall deflecting most of the catalyst from the chamber 30 and the vacuum outlet.

The precise area or dimensions of the opening 32 to the chamber 30 is not fixed and may be any size smaller than the plane of the chamber 30 having the largest area, such as the area of a cross-section of the plane taken parallel to the chamber inlet 32. For the embodiment shown in FIG. 1, the diameter 34 of the round inlet 32 of the chamber is ⅝ inch, though larger diameters are contemplated, and the widest diameter 36 of the round chamber 30 is 1.5 inches, though larger diameters are contemplated. Smaller inlet diameters down to ¼ inch have been found to work fine, but slow down the process of filling the receptacle 2 with liquid. It should be clear to one of ordinary skill in the art that if the chamber inlet 32 were substantially the same size as or smaller than a drop of liquid, the purpose of the chamber in passing sparging gas to the vacuum outlet would be defeated when condensed liquid from the chamber 30 began to drip back into the receptacle 2. Larger openings and chambers may be alternately be used.

It has been found that a slight and substantially continuous vibration applied to the receptacle 2 reduces the consumption of the base liquid and helps to break the surface tension of the liquid resulting in better catalyst transfer to the air region 10 of the receptacle 2 and better fractionation of the bubbles at a consistent rate. To accomplish this vibration, the receptacle 2, or in embodiments where a delivery system housing is used, the housing, may be mounted to the chassis of an automobile, or to a vibrating motor where application permits. If the vibration is too excessive, such as would result if the receptacle were mounted directly to the engine block of a diesel fuel engine, the bubble fractionation is disrupted too much and the catalyst transfer is less consistent or may be stopped altogether. Thus, the frequency and magnitude of the vibration, while not crucial, should not vibrate the receptacle to a point of causing excessive sloshing or splashing of the catalyst mixture within the receptacle for the increased risk that the catalyst mixture will be drawn from the receptacle in liquid form. For use of a catalyst receptacle in extreme vibration environments, the receptacle may be mounted to a mounting plate which is then coupled to the environment, and the mounting plate may be buffered from the vibration of the environment through buffering springs, rubber isolators, or other vibration resisting elements known in the art. In one particular embodiment, the receptacle 2 and a catalyst transport system (shown in FIGS. 6 and 7), are coupled to a common mounting plate and enclosed in a housing. The mounting plate is buffered from the housing to reduce the vibrations which may be caused by the environment in which the housing is placed.

In applications where a vibration source such as a reciprocating engine is not available, a separate vibrator may be coupled to the receptacle 2, to a common mounting plate with the receptacle, or to a delivery system housing to provide the vibration. In one particular embodiment of the invention, the separate vibration source is the vacuum pump used to transfer the catalyst sparging gas to the flame zone. By coupling the vacuum pump and the receptacle to a common mounting plate, the vibrations of the vacuum pump provide the slight and substantially continuous vibrations for the receptacle.

Figure 3:
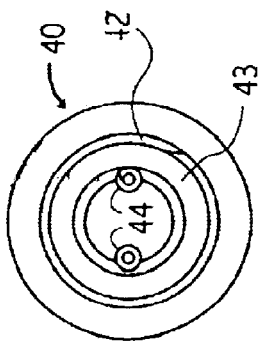

A removable chamber cap 40 having internal threads 42 and two vacuum tube connectors or nipples 44 is shown in the embodiment of FIG. 1. FIG. 3 includes a bottom view of the chamber cap 40. The vacuum tube nipples 44 are conventional nipples for attaching tubes having openings extending therethrough to enable sparging gas to be drawn by a vacuum source through the chamber cap 40. On the inside of the chamber cap 40, the nipples extend below the surface of the inside of the cap 40 to further reduce the opportunity for mixture which has condensed on the cap, or been splashed or sloshed there, from being drawn into the vacuum outlet to the flame zone in liquid form. When the chamber cap 40 is threadedly tightened onto the chamber opening 46, having external threads 48, an airtight seal is formed to enable creation of a vacuum within the chamber 30 and air region 10. Hanging apertures 50 are disposed on reinforcement support 52 to allow the receptacle unit 2 to be hung for use as needed. A gasket 43 may also be included between the lid and an upper ridge of the chamber opening 46 to assist in maintaining an air-tight seal.

Figure 4:
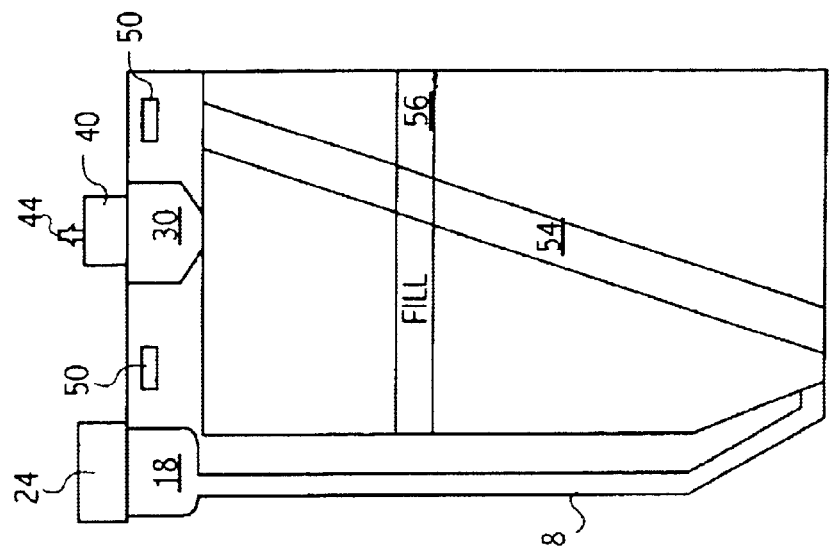
Figure 5:
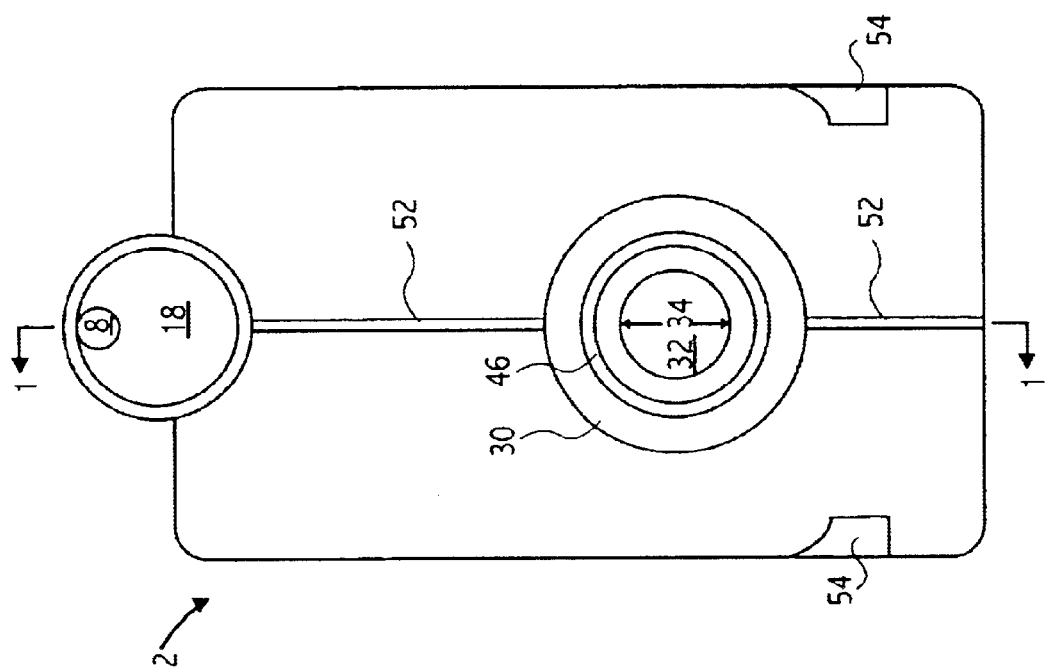

FIG. 4 is a top view of a receptacle 2 for a liquid catalyst such as that shown in FIG. 1, with the air inlet cap 24 and the chamber cap 40 removed. The reinforcement support 52 extends approximately along the center of the receptacle 2, and provides structural support for the air inlet opening 18, and the chamber 30. The tops of reinforcing indentations 54 (FIG. 5) are also illustrated. As shown in FIG. 5, the indentation 54 may extend diagonally across the receptacle 2, or in any other orientation, and provides additional support to the shape of the body against the receptacle body collapsing when a vacuum is formed in the air region 10 of the receptacle volume. By placing the indentation 54 in various orientations across the receptacle body, such as diagonally as shown in FIG. 5, the indentation may also be used to assist in securing the receptacle 2 to a vehicle or other structure by a strap, such as to the battery of a car with the battery strap. Each car battery strap style, orientation, and dimensions, however, is unique. The precise dimensions and orientation needed for a particular battery strap may be readily determined by one of ordinary skill in the art.

A recommended fill region 56 is shown on the side of the receptacle 2. Like the reinforcement indentation, the fill region may be indented to provide additional structural support to the walls of the receptacle. For the embodiment of the receptacle 2 shown in FIG. 5, a chamber cap 40 with only a single nipple 44 is used. Both single- and double-nippled chamber caps may be used on the same receptacle depending upon the desired application of embodiments of the invention, as described in more detail with relation to FIGS. 6 and 7.

The receptacle 2, chamber 30, support 52, air inlet 8, and caps 24 and 40 may be formed of any liquid-tight material which is not susceptible to deterioration from the catalyst mixture to be carried inside. Many plastics or rubbers are sufficient for this purpose because they are unaffected by the acidic mixtures often used as catalyst mixtures. With a plastic or rubber used for the components of the receptacle, the receptacle may be formed, for example, by injection or press molding the materials into the appropriate shapes and sizes. The processes for shaping and forming plastics are well known in the art and it is believed that one of ordinary skill will be able to form the system described herein given the knowledge commonly available to one of ordinary skill and the description herein.

Figure 6:
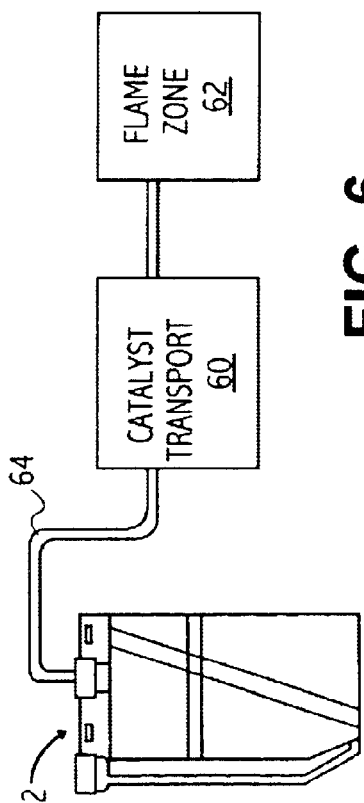

FIG. 6 illustrates the use of the liquid catalyst receptacle 2 in a combustion reaction system. A catalyst transport system 60 relays the sparging gas containing the catalyst particles from the receptacle 2 to the flame zone 62 of a combustion reaction. The catalyst transport system 60 may be as simple as a tube attached to the air inlet of a combustion system, for example in applications where the air inlet creates a vacuum effect (commonly called a Bernoulli or Venturi effect) on the tube 64 attached to the receptacle, or may include more complex vacuum elements, controllers, flow restrictors and/or orifices to assist and regulate the amount of sparging gas entering the flame zone 62. By specific example, in a conventional gasoline (petrol) engine, the tube 64 may be attached directly to the intake manifold, the carborator or the throttle plate. It is well known in the art that 12–15 inches Hg of vacuum pressure is created by the action of the pistons in a gasoline engine at idle. This vacuum pressure is more than sufficient to draw an effective amount of catalyst aerosol through a tube 64 attached to the receptacle 2 into the piston chambers which operate as flame zones 62 in the combustion process.

It should be understood by those of ordinary skill in the art that the catalyst receptacle 2 and catalyst transport 60 may comprise a plurality of receptacles 2 and respectively associated catalyst transports 60, each feeding catalyst particles into a flame zone. In a particular embodiment of the invention which employs a plurality of receptacles 2 and respective catalyst transports 60, the components of the catalyst mixture ordinarily contained within a single catalyst receptacle 2 may be separated and dispensed separately or in appropriate combinations from different ones of the plurality of receptacles 2. Thus, the particles of a catalyst mixture, for example Platinum, Rhenium and Rhodium, may each be dispensed from its own catalyst receptacle 2, through its own catalyst transport 60 to a common flame zone 62, through sparging, direct injection, pumping, aerosol under pressure, or any other known method. Alternatively, or additionally, the catalyst particles of a single or multiple catalyst receptacle 2 may be dispensed into a plurality of associated or dissociated flame zones, such as the many combustion chambers of a reciprocating engine. Those of ordinary skill in the art will understand that appropriate controllers may be readily configured to coordinate the timing, pressure, volume, and delivery of the respective catalyst particles to selected flame zones.

Research has indicated that after the catalyst particles have been provided to a flame zone for a time and then stopped, the benefits of the catalyst particles are still experienced within the flame zone. It is therefore contemplated that in particular embodiments of the invention, using an appropriately configured controller, the catalyst transport 60 may be cycled on and off selectively to provide catalyst particles to a flame zone for a time and then not provide catalyst particles for a separate time. The use of appropriately configured controllers for other purposes is more fully discussed below.

To limit the amount of sparging gas drawn through the tube 64, a restrictor (see FIG. 7) may be used. Appropriate restrictors are commonly available in the fluid flow industry and may be purchased from Coors Technologies of Golden, Colo. To obtain a bubble rate of approximately 3–5 bubbles per second in a gasoline engine using a catalyst mixture such as that disclosed in U.S. Pat. No. 4,475,483 to Robinson, a 0.009 inch ceramic restrictor may be used. A restrictor is placed in-line with the catalyst transport tube 64 and includes a small opening through its center axis to restrict the sparging gas flow through the restrictor. If a different bubble rate is desired, or a different vacuum pressure is used, a different restrictor size may be calculated by one of ordinary skill in the art depending upon the specific application and needs of the combustion system.

Figure 7:
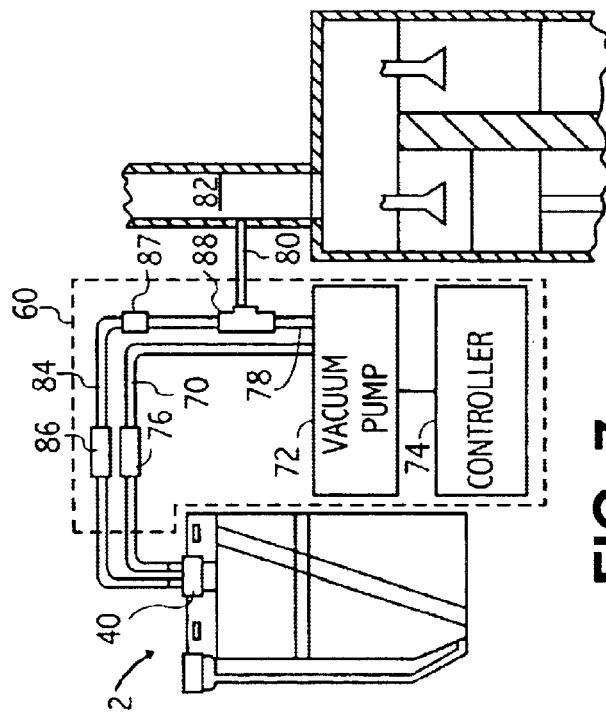

FIG. 7 illustrates a more complex version of a catalyst transport system 60 being used with a diesel fuel engine. As is well known in the art, diesel fuel engines produce almost no vacuum pressure within the engine. Thus, embodiments of the present catalyst delivery system for use with a diesel fuel engine involve a more complex catalyst transport system 60 which includes an enrichment circuit to provide additional catalyst enrichment when the engine is operating at high load. Diesel fuel engines also include a very wide range of fuel requirements from idle speed to full load. Thus, a variable or on-demand enrichment circuit may be included as part of the catalyst transport system 60.

In the embodiment of the catalyst delivery system shown in FIG. 7, a two-nippled chamber cap 40 is used. A first tube 70 is coupled to a first nipple of the chamber cap 40 and extends to a vacuum pump 72. Vacuum pump 72 is associated with controller 74. The first tube 70 includes a restrictor 76. Sparging gas in the first tube 70 is transported through restrictor 76 and first tube 70 into the vacuum pump 72, and is then pumped into junction tube 78 and then into intake manifold 82 through catalyst tube 80 which joins the catalyst transport paths of the first tube 70 and a second tube 84. The second tube 84 is coupled to a second nipple of the chamber cap 40 and extends through a restrictor 86 and a one-way check valve 87 before being coupled to a junction 88. The one-way check valve 87 blocks any sparging gas from being transported through the second tube 84 until a minimum vacuum pressure is experienced in the catalyst tube 80.

Under high load conditions for a diesel engine, a large amount of air is drawn into the engine through the intake manifold and additional catalyst sparging gas is needed to maintain the advantages of the catalyst delivery system in the combustion process. By providing a second tube 84 with a check valve 87, additional catalyst sparging gas is not drawn through the second tube unless and until the engine draws air through the intake manifold sufficiently fast to create a threshold vacuum effect in the catalyst tube 80. The amount of additional sparging gas drawn is proportional to the amount of vacuum pressure to a maximum vacuum pressure depending upon the size of the restrictor 86 opening or orifice. In this way, only the amount of additional catalyst needed is supplied to the combustion process, but a maximum limit is set for the system by the restrictors. In one particular embodiment of the invention for a diesel fuel engine, the vacuum pump 72 produces approximately 5–6 inches Hg of vacuum pressure, restrictors 76 and 86 are ceramic restrictors and have openings of a diameter between about 0.015 inches to about 0.020 inches, and the check valve 87 is a duck bill check valve having a cracking pressure of approximately 1 inch H2O of vacuum pressure or greater (sold through Apollo Pumps, Erving Calif.). The same system could also be used for an open flame combustion system where a pump provides sparging gas to the open flame zone either with or without an enrichment circuit as discussed above. As will be clear from the discussion herein, embodiments of the present invention may be readily adapted to the combustion of all carbon-based fuels regardless of the combustion process used.

Figure 8:
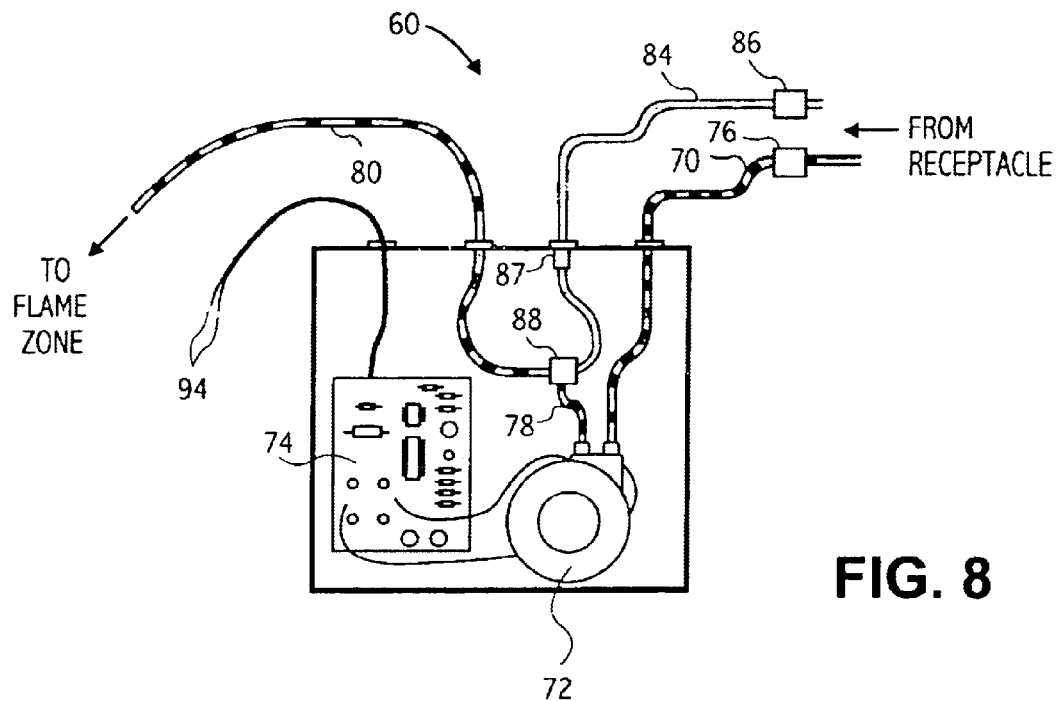

FIGS. 8 and 9 illustrate a specific embodiment of the catalyst transport system to more clearly describe its operation when a vacuum pump 72 and an on-demand enrichment circuit is used, such as that used with a diesel fuel engine or other application with insufficient vacuum pressure or variable catalyst requirements. FIG. 8 illustrates a low load example and FIG. 9 illustrates a high load example where enrichment is added. Under low load conditions, a vacuum pump 72 draws sparging gas containing catalyst particles through a first tube 70 and restrictor 76 and pushes the fluid through junction tube 78 to the catalyst tube 80 and to the flame zone. This flow path is indicated in FIG. 8 by the striped tubes. Under high load conditions, where an additional vacuum is created within the catalyst tube 80, to the extent the vacuum pressure exceeds a predetermined cracking pressure threshold of the check valve 87, additional sparging gas is drawn from the receptacle through the second tube 84 and restrictor 86, through the check valve 87, junction 88, catalyst tube 80, and to the flame zone. As with other embodiments of the invention, restrictors may be omitted if desired. Additionally, if enrichment is not needed or desired for a particular application of the invention, the second tube 84, the restrictor 86 and the check valve 87 may be omitted. This allows for use of the invention in applications where a vacuum pump is desirable without additional on-demand enrichment. As described further below, the vacuum pump 72 may optionally be made variable and be controlled by the controller 74 to provide on-demand enrichment of the combustion reaction. Furthermore, a variable check valve 87 may be used to enable adjustments to the point at which the enrichment circuit is activated, or to enable a control circuit to actively adjust the enrichment in response to the particular or changing needs of the combustion process.

FIGS. 8 and 9 also indicate a controller 74 circuit board. For an application of the invention for use in an automobile, the controller 74 is coupled to the ignition system of the vehicle so that the catalyst system is active only when the vehicle is running. In other applications, the controller 74 may be coupled to whatever ignition system activates the combustion reaction process so that sparging gas is not being pumped to the flame zone unless a combustion process is occurring in the flame zone. In a particular application of the controller 74, the controller includes a clock and timer circuit to track and record the operation of the catalyst delivery system. In another particular embodiment of the controller 74, the controller 74 further includes an alarm to indicate when a predetermined threshold time of operation has been reached. Tracking and recording the operation of the delivery system may allow an owner or a government entity to collect data regarding use of the catalyst delivery system.

An alarm may be used to indicate when the catalyst needs to be replenished, or when other maintenance on the system needs to be performed. The alarm may be in the form of a visual display, such as a light emitting diode (LED), an audible sound, digital or analog signal, or any other measurable indication that a threshold has been reached. The alarm may be in the form of a remote indicator such as, for example, using an radio frequency (RF) or other signal to transmit the alarm to a remote receiver, or through direct wiring to a remote location such as a display within the cab of a vehicle or a control panel for the combustion process. More sophisticated controllers 74 which track additional information such as catalyst levels, sparging gas volume flow, fuel efficiency, and the like may also be employed and configured to transmit to a remote receiver and/or display. The controller 74 may also selectively activate and deactivate the vacuum pump 72 based upon predetermined criteria such as engine load, and the like, or control the speed of the vacuum pump 72 based upon similar criteria. Power and ground wires 94 are included to provide appropriate power supply to the vacuum pump 72 and the controller 74.

While embodiments of the invention have generally described use of the present delivery system with gasoline and diesel engines, it should be understood that the use of sparging gas to carry catalyst to a flame zone is also useful in applications for other fuels, such as alternative fuels, and for other types of combustion processes. For example, it is contemplated that the present delivery system, using the principles described herein, may readily be applied by one of ordinary skill in the art to the combustion processes used for incinerators, furnaces, boilers, incinerators, turbine engines, and open flame applications where the combustion process is not used directly for work.

As should be clear to those of ordinary skill in the art by the explanation provided herein, embodiments of the present invention may be used to generate and deliver sparging gas containing catalyst particles to any fuel combustion process and is not limited to the specific applications discussed herein. The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. For example, it is contemplated that in addition to being drawn into a flame zone of a combustion reaction, the catalyst may be directly injected to a flame zone or an air intake to a flame zone by pressurizing the sparging gas and injecting it as an aerosol using a pump selectively controlled by an appropriately configured controller.

What is claimed is:

1. A liquid catalyst delivery system comprising:
    a liquid catalyst receptacle having an air inlet and an outlet; and
    a catalyst transport for transporting catalyst particles in a sparging gas to a flame zone of a combustion process, the catalyst transport comprising:
        a first sparging gas transport path coupled to the receptacle outlet and configured to transport sparging gas at a first rate; and
        a second sparging gas transport path coupled to the receptacle outlet and configured to transport sparging gas at a second rate in response to an increase in demand for catalyst at the flame zone,
    wherein the catalyst transport is configured to substantially maintain the first transport rate of sparging gas through the first sparging gas transport path when the second sparging gas transport path transports sparging gas at the second rate in response to the increase in the demand for catalyst at the flame zone.

2. The liquid catalyst delivery system of claim 1, wherein the first sparging gas transport path comprises a pump coupled to the receptacle outlet, the pump configured to pump the sparging gas from the receptacle outlet at the first rate.

3. The liquid catalyst delivery system of claim 2, wherein the second sparging gas transport path comprises a check valve configured to open to sparging gas flow therethrough in response to pressure on a side of the check valve exceeding a predetermined threshold pressure.

4. The liquid catalyst delivery system of claim 1, wherein the first and second transport paths join into a joined transport path configured to transport the sparging gas from the first and second transport paths, and wherein the second transport path is configured to transport catalyst only when vacuum pressure in the joined transport path exceeds a predetermined threshold pressure.

5. The liquid catalyst delivery system of claim 1, wherein the first rate is a variable rate.

6. The liquid catalyst delivery system of claim 1, wherein the second rate is a variable rate.

7. The liquid catalyst delivery system of claim 1, further comprising a catalyst transport control coupled to the catalyst transport and configured to regulate flow of sparging gas through at least one of the transport paths.

8. The liquid catalyst delivery system of claim 7, wherein the catalyst transport control comprises a sparging gas flow restrictor coupled inline with the second sparging gas transport path.

9. The liquid catalyst delivery system of claim 8, wherein the sparging gas flow restrictor is configured to establish a maximum flow rate through the second sparging gas transport path.

10. The liquid catalyst delivery system of claim 8, wherein the catalyst transport control further comprises a second sparging gas flow restrictor coupled inline with the first sparging gas transport path.

11. The liquid catalyst delivery system of claim 10, wherein the second sparging gas flow restrictor is configured to establish a maximum flow rate through the first sparging gas transport path.

12. The liquid catalyst delivery system of claim 1, further comprising a catalyst transport control configured to monitor catalyst transport and relay catalyst transport information to a remote location.

13. The liquid catalyst delivery system of claim 12, wherein the catalyst transport information comprises an indication that a predetermined threshold of operation has been reached.

14. The liquid catalyst delivery system of claim 1, further comprising a mounting plate coupled to the receptacle and a vibration source.

15. The liquid catalyst delivery system of claim 14, wherein the vibration source comprises a pump.

16. The liquid catalyst delivery system of claim 1, wherein the receptacle comprises an air inlet opening positioned and oriented such that air bubbles released into a catalyst mixture in the receptacle from the air inlet opening do not contact a solid object before reaching an upper surface of the catalyst mixture.

17. The liquid catalyst delivery system of claim 1, wherein the receptacle comprises a chamber in communication with an opening in a wall of the receptacle, the chamber having a cross-sectional area larger than an area of the opening.

18. A method of providing catalyst to an air intake for a combustion process, the method comprising:

sparging air through a liquid catalyst mixture in a receptacle to produce sparging gas; and transporting the sparging gas from the receptacle at a first rate before transporting the sparging gas from the receptacle at a second rate higher than the first rate when demand for sparging gas at the air intake exceeds a predetermined threshold;

wherein transporting sparging gas at the first rate comprises transporting sparging gas through a first transport path and transporting sparging gas at the second rate comprises transporting sparging gas through both the first transport path at substantially the first rate simultaneous with transporting sparging gas through a second transport path.

19. The method of claim 18, wherein the second rate is a variable rate.

20. The method of claim 18, wherein the variable rate corresponds to a vacuum pressure caused by air moving through the air intake.

21. The method of claim 18, wherein transporting sparging gas at a first rate comprises pumping the sparging gas with a vacuum pump.

22. The method of claim 18, wherein transporting sparging gas at the second rate comprises opening a valve to allow sparging gas to be drawn through the second transport path by a vacuum caused by air moving through the air intake.

* * * * *